Nov. 12, 1940.    R. M. EDINGTON    2,221,045
BROODER
Filed April 1, 1937    2 Sheets-Sheet 2
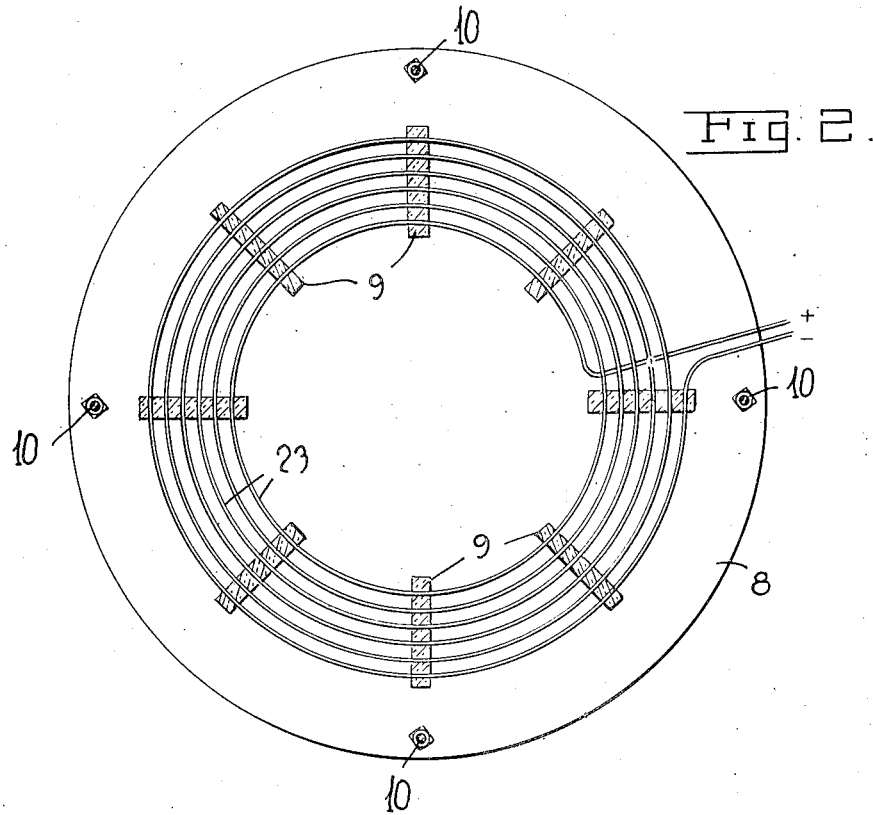
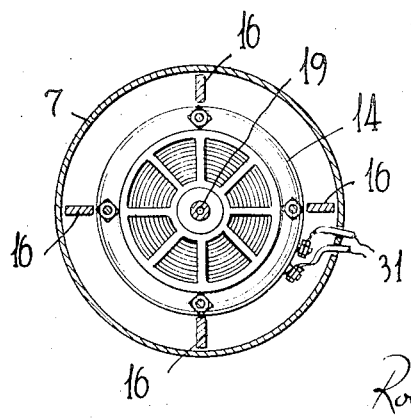

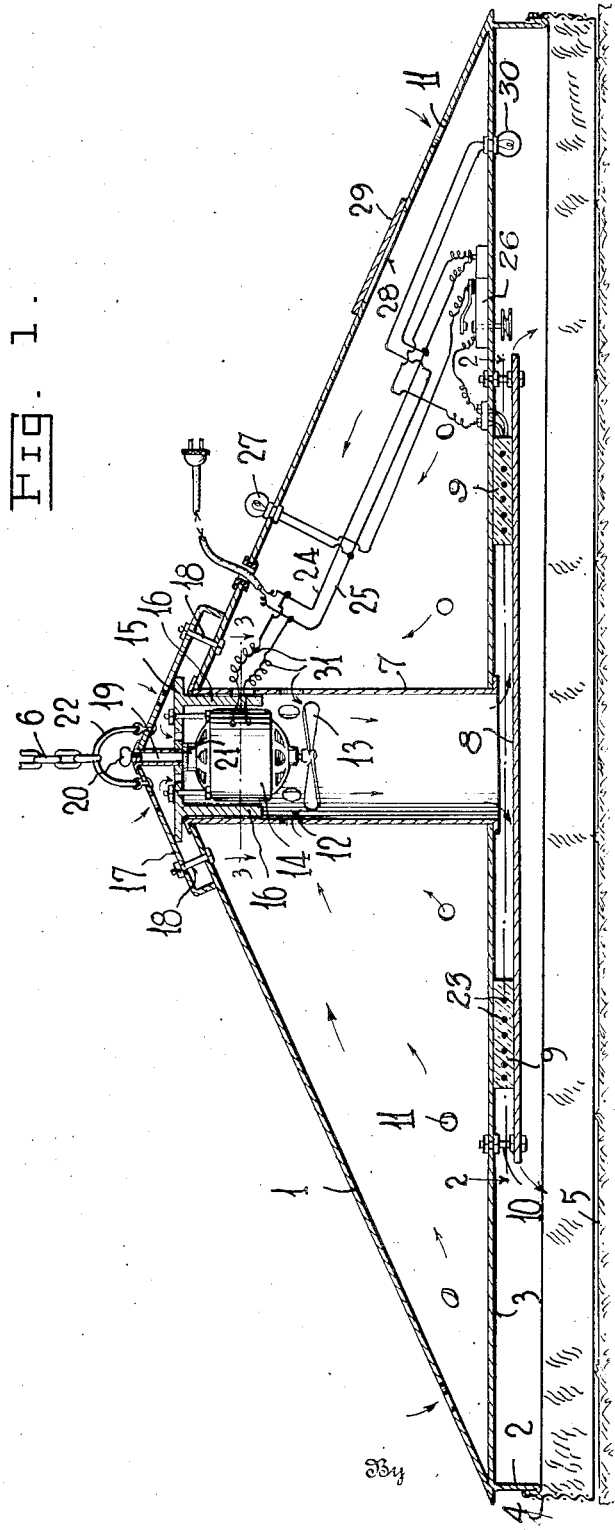

Patented Nov. 12, 1940

2,221,045

UNITED STATES PATENT OFFICE 2,221,045

BROODER

Robert M. Edington, Vineland, N. J.

Application April 1, 1937, Serial No. 134,407

1 Claim. (Cl. 119—33)

My invention relates to brooders for the housing and warming of newly hatched chicks and other young poultry.

An object of the invention is to provide a brooder having means for supplying the chick compartment with fresh, warmed air in quantities sufficient to satisfy the requirements of the chicks. A further object is to maintain the humidity characteristics of the supplied air at optimum values, and more particularly to eliminate the condensation of moisture in the chick compartment and the precipitation of water onto the chicks or the floor. Such condensation and precipitation have constituted serious disadvantages of the best prior art brooders which attempt to supply copious quantities of fresh air.

A further object of the invention is to provide, in a brooder, cooperating means for circulating air and supplying fresh air, and means for thermostatically controlling the temperature of the supplied air in accordance with external air conditions and in response to predetermined settings of a thermostat.

At this point it is to be observed the best fresh-air-supplying prior art brooders of which I am aware have the serious drawback of wetting the chicks or the litter on the floor of the brooder whenever the external air is relatively cold and of comparatively high humidity. This effect is occasioned in such brooders by the presence of cold external air in contact with the outer surface of a roof, wall or the like, and warm air in contact with the inner surface. Moisture condensed on this inner surface by the comparatively low temperature of the wall or roof collects until it eventually saturates the air in the hover and finally falls onto the chicks and the floor, soaking the litter spread there and producing very unhealthy conditions.

In the construction proposed by the present invention these disadvantages are overcome by the provision of a novel type of path through which the incoming air is constrained to flow and by a novel disposition of wall or roof members which present surfaces to the cold and warm air, all as will be explained in detail hereinafter in the explanation of an illustrative embodiment of the invention.

The invention also aims to provide means for permitting much of the dust, if objectionable amounts be present in the external air, to settle out before the air is discharged into the hover. This I consider to be a feature of importance, involving a distinct improvement over those prior art brooders which make no provision for maintaining a clean atmosphere in the hover.

A further advantage of the construction resides in its capacity to supply fresh air at all times, regardless of temperature requirements, i. e., whether or not the incoming air has to be warmed. In the embodiment of the invention selected for illustration this is accomplished electrically, by providing a fan to introduce fresh air and a heating coil for warming it, the fan motor and the heating coil being connected in parallel, with a thermostat in the coil circuit. In this manner the warming of the air is independent of the circulating means, so that the freshness of the air in the hover is entirely unaffected by the need or lack of need of warming the air.

Another object of the invention is to provide means for introducing warm air into the chick compartment of a brooder without subjecting the chicks to a draft of objectionably warm air, i. e., it is intended to provide means for tempering the necessarily quite warm air which is newly introduced, and it is an object of the invention to effect this tempering without wasting or failing to utilize any of the heat content of the newly introduced air.

Other objects of the invention include a novel type of mounting for the fan motor whereby it may readily be removed for repair or replacement, and whereby it is continuously ventilated during operation, and an economical disposition of the heating coil with relation to the external air whereby heat losses to the external air are reduced to a minimum.

Finally, it is an aim of the invention to provide structure for attaining all the foregoing objects at low manufacturing and upkeep costs and which shall be durable, efficient and foolproof. Other advantages will be suggested to those familiar with the art as the following description of a preferred embodiment of the invention proceeds.

In the accompanying drawings, which, together with the following detailed explanation of the structure there depicted, disclose an embodiment of the inventive concept which has proved satisfactory in actual use and which is therefore selected merely to illustrate a preferred embodiment, Figure 1 is a vertical diametrical sectional view;

Fig. 2 is a horizontal section taken on the line 2—2 of Fig. 1; and

Fig. 3 is a horizontal section taken on the line 3—3 of Fig. 1.

Referring to the drawings, the brooder comprises a roof 1, conveniently made of sheet metal and of generally conical shape and provided with a base 3, also made of sheet metal, and imperforate except for a circular opening in its center, which forms the cealing of the chick compartment. A peripheral flange or skirt 2 depends from the roof, and from this flange a curtain 4 of cloth or the like may be hung which is kept spaced slightly above the ground or floor 5 by mounting the brooder on conventional legs (not shown) or by hanging the brooder from above through the medium of a chain or the like 6, hereinafter to be referred to.

The conical roof is truncated slightly, providing an axial opening directly above the central opening in the ceiling 3, and these two openings are connected by a tubular central air duct 7. The connections between the roof, ceiling, skirt and duct elements may be made by suitable flanging or upsetting of the engaged parts, with or without soldering or spot welding, or in any other convenient manner capable of providing a reasonably rigid and substantial structure. If desired, some or all of the connections may be made detachable to permit total or partial dismantling and access to the interior.

Slung below the ceiling 3 is a false ceiling 8, concentric with the ceiling but of smaller diameter, as shown. The false ceiling is spaced slightly below the ceiling, the spaced relationship being maintained by insulating blocks set radially around the false ceiling, as shown by Figs. 1 and 2, and by nut and bolt means or the like 10. Spaced apart perforations 11 in the roof near its base, and similar perforations 12 in the upper portion of the duct 7, provide a passage for air from outside the brooder, into the space between the roof and ceiling, thence into the duct 7, whence the air may pass radially through the space between the ceiling and false ceiling, to issue into the chick compartment by flowing over the peripheral edge of the false ceiling, all as indicated by the arrows in Fig. 1.

A fan 13 is mounted in the upper portion of the duct 7 to move the air along the path indicated. This fan is preferably driven by a motor 14 suspended from a perforated motor-supporting plate 15 closing the upper end of the duct, and the motor may be centered in the duct and held against vibration by resilient or rigid spacer blocks 16. A perforated cap 17 may be secured over the apex of the roof by bolt and nut means or the like 18, and this cap may bear on the peripheral edge of the plate 15 and so hold it centered and in place. The cap 17 is preferably centrally apertured to receive an oil tube 19 closed by a screwthreaded plug 20. The lower end of the oil tube penetrates a central opening in the plate 15 and communicates with the hollow shaft of the motor, the junction being surrounded by an oil-sealing felt washer or the like 21. By this arrangement the bearings of the motor may be lubricated by oil supplied from time to time through the tube 19. The small openings in the cap 17 and plate 15 admit air from the outside to ventilate the motor. This air passes down through the duct 7 with the larger volume of air taken in through the roof openings 11.

A bail 22 may surmount the cap 17 from which the brooder may be hung by the chain or the like 6 already mentioned.

To warm the air which is driven by the fan through the path indicated, a heating coil 23 is carried by the insulating blocks 9, and it will be evident from Figs. 1 and 2 that all the air driven by the fan into the chick compartment must pass over this coil. The circuits for the motor and heating coil are shown spread out in diagrammatic fashion in Fig. 1, from which it will be observed that a pair of main supply wires 24, 25 enter the roof through a small opening provided with an insulating bushing. These wires run to the coil 23 with which a thermostat 26 and a pilot lamp 27 are in series. The thermostat is adjustable through the hand hole 28 closed by a cover 29 to control the temperature in the chick compartment, and the pilot light indicates whether or not the coil is energized. By parallel connections from the main lines 24, 25, the motor is supplied, as is also an attraction light 30 in the chick compartment. Pigtails 31 permit the motor to be removed without breaking its connection with the circuit, and the fact that the motor and the attraction light are in parallel with the heating coil permits these two means to be kept energized independently of the coil. In this way fresh air may be always supplied whether or not its temperature is such as to require warming, and the attraction light may be kept constantly lit until the chicks become accustomed to the brooder, when it may be removed.

The physical structure having been thus explained, it will be evident that the objects outlined above are attained as follows:

Relatively cold air from the outside is inducted, by operation of the fan, through the openings 11 into the large chamber defined by the roof, ceiling and duct. Its motion in this chamber is, because of the large size of the chamber, exceeding slow, so that much of the entrained dust settles out of the air. The floor of the chamber is kept warmed by the warmth of the chick compartment, so that in the chamber the incoming air is slightly preheated. It is to be observed that this preheating is by virtue of the utilization of heat which would be dissipated to the outer atmosphere if no such preheating chamber were provided in heat exchange relationship with the chick compartment. In other words, if the ceiling 3 were the roof of the brooder, all the heat which passed through it would be lost. By providing the preheating chamber I reduce very largely the heat losses suffered by conventional brooders. Moreover, the warmest air in the system is passed in a constantly moving stream along the under surface of the ceiling 3, so that that surface becomes quite warm and no condensation on it can take place. That is to say, if a current of warm air were not moved across this surface, which is the top of the chick compartment, the surface would be cooled by the newly introduced air above the ceiling and droplets of water would collect on it and would eventually fall onto the chicks or the floor 5. This feature of the invention is, as has been stated at the outset of this specification, deemed to be of great importance.

The warm, fresh air discharged into the chick compartment over the peripheral edge of the false ceiling 8 is deflected back toward the central zone of the compartment by the outer wall 2 and curtain 4, so that the whole compartment is kept uniformly warmed to the temperature for which the thermostat is set. The air eventually escapes under the edge of the curtain 4 and is replenished by the constant supply of incoming air. An abundance of fresh air, warmed if necessary, is thus always maintained, and the comparatively highly warmed air which is discharged into the chick compartment immediately after passing over the heating coil is tempered by the comparative coolness of the ceiling surface across which it is moved, so that the chicks are not subjected to a draft of objectionably warm air.

Thus, in the manner hereinabove explained, the structure selected to illustrate the invention accomplishes the purposes of the invention as set forth at the beginning of this specification.

I claim:

In a brooder, a roof having a series of air inlet openings spaced at intervals about its peripheral margin, a sheet metal ceiling of relatively high heat conductivity disposed below the roof and forming therewith an air chamber to which air is admitted radially inwardly in a plurality of streams through said openings, an air duct rising toward the roof from a central opening in the ceiling and receiving air from said chamber through a peripheral opening in its upper portion, blower means in the duct for moving air through the openings in the roof and duct, a false ceiling spaced below the central portion only of the ceiling for directing air issuing from the duct radially outwardly across the under surface of the ceiling, and air warming means in the path of said air positioned between the ceiling and the false ceiling.

ROBERT M. EDINGTON.